United States Patent
Tanaka et al.

[11] Patent Number: 5,760,257
[45] Date of Patent: Jun. 2, 1998

[54] PIGMENT DISPERSANT

[75] Inventors: Hiroyuki Tanaka; Toshiaki Okayasu; Sae Sugiyama, all of Kawasaki, Japan

[73] Assignee: Ajinomoto Co., Inc., Tokyo, Japan

[21] Appl. No.: 733,137

[22] Filed: Oct. 16, 1996

[30] Foreign Application Priority Data

Oct. 16, 1995 [JP] Japan .................. 7-267486
Sep. 6, 1996 [JP] Japan .................. 8-237036

[51] Int. Cl.⁶ .................. C07C 233/05; C08L 93/00; C09D 11/08
[52] U.S. Cl. .................. 554/36; 554/35; 554/37; 554/105; 554/106; 560/157; 560/158; 564/152; 106/241; 106/504; 524/515; 524/523; 524/548; 524/560; 525/163; 525/176; 525/438; 525/445
[58] Field of Search .................. 564/152; 560/157, 560/158; 106/504, 214; 524/515, 523, 548, 560; 525/163, 176, 438, 445; 554/35, 36, 37, 105, 106

[56] References Cited

U.S. PATENT DOCUMENTS 3,505,268  4/1970  Backhouse e tal. .................. 260/31.2
3,723,151  3/1973  Backhouse et al. .................. 106/308 Q
4,861,380  8/1989  Campbell et al. .................. 106/504

*Primary Examiner*—Shailendra Kumar
*Attorney, Agent, or Firm*—Oblon, Spivak, McClelland, Maier & Neustadt, P.C.

[57] ABSTRACT

A pigment-dispersible polyallylamine derivative represented by formula (I), and a pigment dispersant containing the same as an active ingredient exhibit excellent compatibility with a wide variety of resins and excellent pigment dispersibility.

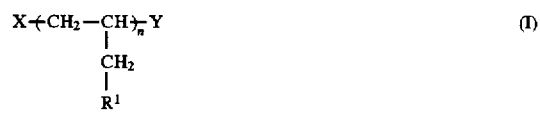

In formula (I), $R^1$ represents a residue in which a free amino group or an amino group of a polyallylamine is bound to a polyester, a polyamide or a copolycondensate of an ester and an amide by a covalent bond (acid amide bond) or by salt (primary ammonium salt) formation through terminal carboxyl groups, and at least one of the $R^1$'s is a residue that has the covalent bond, n is an integer of from 2 to 1,000, and X and Y, independently from each other, are hydrogen, a polymerization initiator residue or a chain transfer catalyst residue.

11 Claims, No Drawings

PIGMENT DISPERSANT

BACKGROUND OF THE INVENTION

1. Field of the Invention

The present invention relates to a pigment-dispersible compound (pigment dispersant) which is used to improve pigment dispersibility when a resin and other starting materials are mixed with a pigment in the production of color paints, printing inks, copying toners, magnetic tapes, rubber magnets, color plastics moldings, sealing agents and the like.

2. Discussion of the Background

Color paints, printing inks, copying toners, magnetic tapes, rubber magnets, color plastic moldings and sealing agents are pigment-containing resin compositions produced by adding pigments to resins and other materials. The most significant problem experienced in producing such pigment-containing resin compositions in which the pigments are dispersed, is the tendency of the pigment particles to be aggregated easily. Such aggregation occurs during processes such as dispersing the pigments, dissolving the pigment-containing resin compositions, storing the pigment-containing resin compositions, molding color plastics and painting the pigment-containing resin compositions. As a result, undesirable events may occur, such as reduction in stability of the pigment-containing resin compositions in which the pigments are dispersed, troubles during painting and molding, reduction in gloss, coloring ability and sharpness of the final paint films or products, color separation, floating and reduction in mechanical strength.

To solve the above mentioned problems, a variety of pigment dispersants or dispersion aids have been proposed for improving the pigment dispersibility. For example, the following methods are known.

(a) A method in which a nonionic, cationic or anionic surfactant or a wetting agent, such as an aliphatic polybasic carboxylic acid, is used as a dispersant or a dispersion aid.

(b) A method in which a pigment is dispersed using a combination of a pigment-compatible substance and a medium-compatible substance as described in British Patent Nos. 1,108,261, 1,159,252 and 1,346,298.

(c) A method in which a surfactant such as an alkyl silicone or the like is used to decrease surface tension, preventing the occurrence of floating.

(d) A method in which pigment dispersion is conducted by mixing a pigment derivative having a substituent (which is also a pigment) instead of a conventional pigment itself as described in Japanese Laid-Open Patent Application (Kokai) No. 18,736/1976.

(e) A method in which a compound obtained by reacting a polyalkyleneimine with a polyester compound is used as a dispersant as described in Japanese Laid-Open Patent Application (Kokai) Nos. 37,082/1979 and 174,939/1986.

Problems To Be Solved By the Invention

However, since the dispersion aid or the pigment dispersant which is used in above-mentioned methods (a) to (c) has a low molecular weight and the length of the side chain of the dispersant is short, the effect of steric hindrance is insufficient, making it difficult to obtain a stable dispersed state of pigment particles. Further, since the pigment derivative having a substituent as used in method (d) has a pigment structure and is substantially colored, it cannot be used as a multipurpose dispersant for various pigments.

The basic concept of the pigment dispersant in method (e) is described in Progress In Organic Coatings, vol. 5 (1977), pp. 237–243. It is stated that a compound having a side chain which is solvated with a solvent and which interacts with a film-forming resin and an adsorption part which is adsorbed onto a pigment is preferable as a pigment dispersant. However, the pigment dispersant obtained by method (e) described in Japanese Laid-Open Patent Application (Kokai) No. 37,082/1979 is problematic. Since the side chain of the dispersant is obtained by self-condensation of 12-hydroxystearic acid, the polarity is quite low, and resins which are compatible with the side chain are quite limited. In addition, the dispersing ability is not sufficient since the amino group at the site of adsorption to a pigment is readily subjected to steric hindrance during the adsorption process because of the use of a polyalkyleneimine having a highly branched structure as the component for the adsorption to the pigment. A pigment dispersant obtained by the method disclosed in Japanese Laid-Open Patent Application (Kokai) No. 174939/1986 also has insufficient dispersing ability because of the amino group at the site of the adsorption which is readily subjected to steric hindrance since it employs a polyalkyleneimine similar to the pigment dispersant obtained by the method disclosed in Japanese Laid-Open Patent Application (Kokai) No. 37082/1979 mentioned above. The dispersant described in Japanese Laid-Open Patent Application (Kokai) No. 38875/1996 employs as a side chain a polyester containing as an essential component a unit formed by ring-opening of a lactone compound and as an adsorption moiety a polyallylamine, but its dispersing ability is not sufficient even when a dispersant as embodied in Japanese Laid-Open Patent Application (Kokai) No. 38875/1996 is employed.

SUMMARY OF THE INVENTION

It has now been discovered that by modifying the amino group of the polyallylamine side chain with a polyester, a polyamide or a co-condensate of a polyester and a polyamide (polyester amide), a novel polyallylamine derivative having a wide range of compatibility with resins in which a pigment is to be dispersed and excellent pigment dispersing ability is obtained. In addition, by restricting the degree of modification of the polyallylamine side chain in the polyallylamine derivative according to the invention, a polyallylamine derivative having a very advantageous pigment dispersing ability is obtained.

Thus, the present invention relates to a polyallylamine derivative represented by formula (I), a pigment dispersant containing as an active ingredient the polyallylamine derivative, a treated pigment obtained by treating a pigment with the pigment dispersant, a pigment-containing resin composition containing the pigment dispersant, a pigment and a resin as well as a paint or ink composition containing the pigment dispersant. In formula (I)

each of X and Y independently denotes an initiator residue or chain transfer catalyst residue, $R^1$ denotes a free amino group, or a group represented by formula (II) or (III), n denotes an integer of 2 to 1,000, provided that at least one of the $R^1$s, the number of which is n, is a group represented by formula (III)

wherein $R^2$ denotes a residue obtained by removing a carboxyl group from a polyester having a free carboxylic acid, a polyamide having a free carboxylic acid or a polyesteramide having a free carboxylic acid.

DETAILED DESCRIPTION OF THE PREFERRED EMBODIMENTS

The polyallylamine derivative according to the present invention, i.e., a pigment-dispersing polyallylamine derivative and a pigment dispersant and a composition containing the same as an active ingredient are detailed below.

The polyallylamine derivative according to the present invention is obtained by reacting a polyallylamine with one or more compounds selected from the group consisting of free carboxylic acid-carrying polyesters, polyamides or co-condensates of a polyester and a polyamide (polyester amides).

More specifically, the polyallylamine derivative may be prepared from a polyallylamine having a polymerization degree of 2 to 1,000 together with one or more of a free carboxylic acid-carrying polyester represented by formula (IV) or (V) and a polyamide represented by formula (VI) or (VII) as starting materials. In formula (IV)

(IV)

$R^3$ denotes a straight or branched alkylene group having 2 to 20 carbon atoms, and "a" denotes an integer of 2 to 100.

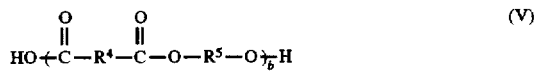
(V)

In formula (V), $R^4$ denotes a straight or branched alkylene group having 2 to 20 carbon atoms, $C_6H_4$ or $CH=CH$, $R^5$ denotes a straight or branched alkylene group having 2 to 20 carbon atoms or a residue obtained by removing two hydroxyl groups from a polyalkylene glycol, and "b" denotes an integer of 2 to 100, wherein the alkylene group optionally contains an ether bond. In formula (VI)

(VI)

$R^6$ denotes a straight or branched alkylene group having 2 to 20 carbon atoms and "c" denotes an integer of 2 to 100.

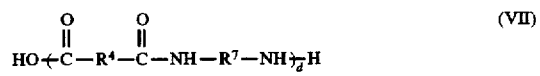
(VII)

In formula (VII), $R^4$ denotes a straight or branched alkylene group having 2 to 20 carbon atoms, $C_6H_4$ or $CH=CH$, $R^7$ denotes a straight or branched alkylene group having 2 to 20 carbon atoms, and "d" denotes an integer of 2 to 100.

The polyallylamine derivative according to the invention may also be obtained by reacting a polyallylamine with a polyester having the repeating units in formula (IV) and formula (V) which were polymerized randomly, a polyamide having the repeating units in formula (VI) and formula (VII) which were polymerized randomly, and a polyesteramide having the repeating units in formula (IV) and/or (V) and formula (VI) and/or (VII) which were polymerized randomly.

The polyallylamine employed in the preparation of a polyallylamine derivative according to the invention is produced by polymerizing allylamine in the presence of an initiator and optionally in the presence of chain transfer catalyst.

The polymerization initiator is not particularly limited, and an ordinary polymerization initiator can be used. Examples of suitable polymerization initiators include ketone peroxides such as methyl ethyl ketone, diacyl peroxides such as benzoyl peroxide; peroxydicarbonates such as diisopropyl peroxycarbonate; peroxyketals such as 1,1-bis(tert-butylperoxy)cyclohexane; hydroperoxides such as tert-butyl hydroperoxide; peroxyesters such as tert-butyl peroxypivalate; azobisisobutyronitrile; hydrogen peroxide; and ferrous salts. An initiator described in Japanese Laid-Open Patent Application Publication (Kokai) No. 14364/1990 may also be employed.

Examples of the chain transfer catalyst include alkyl mercaptans such as lauryl mercaptan; thiocarboxylic acids such as mercaptoacetic acid, 2-mercaptopropionic acid and 3-mercaptopropionic acid; and thiocarboxylic acid esters such as butyl thioglycolate and 2-ethylhexyl thioglycolate. However, the chain transfer catalyst is not limited thereto.

The number average molecular weight of the polyallylamine used in the invention generally ranges from 150 to 100,000, and a polyallylamine having a number average molecular weight of about 600 to 20,000 is more preferred.

A polyallyamine having a number average molecular weight of 150 to 100,000 is preferred in the present invention because an average molecular weight of 150 or lower causes difficulty in dispersing the pigments due to insufficient adhesion to the pigments while an average molecular weight of 100,000 or higher causes difficulty in dispersing the pigments due to aggregation between the pigments.

A commercial product can be used as a polyallylamine. Examples thereof include PA-1L, PAA-1LV, PAA-14L, PAA-10C, PAA-15, PAA-15B, PAA-L, PAA-H, and PAA-1L-15C made by Nitto Boseki Co., Ltd.

The method described in Japanese Laid-open Patent Application (Kokai) No. 14364/1990 may also be employed to produce a polyallylamine having a desired molecular weight.

The polyester employed in the preparation of a polyallylamine derivative according to the invention may be those represented by formula (IV) or formula (V) as mentioned above. A polyester having the repeating units in formula (IV) and formula (V) which were polymerized randomly may also be employed.

A polyester represented by formula (IV) is prepared from a hydroxycarboxylic acid represented by formula (VIII) or a lactone represented by formula (IX) as a starting material. More specifically, it can be produced by adding a polymerization catalyst to a hydroxy acid, a lactone, or a mixture of such hydroxy acid and lactone. The reaction temperature ranges from 120° to 220° C., preferably 160° to 210° C. The reaction time ranges from 0.5 to 72 hours. Reaction under nitrogen flow results in a higher polymerization degree. The reaction can be controlled easily by using an initiator. When a lactone is employed as a starting material, a monocarboxylic acid may be used as an initiator in an amount of 0 to 0.5 moles per 1 mole of the lactone. In formula (VIII) and (IX)

(VIII)

(IX)

$R^3$ denotes a straight or branched alkylene group having 2 to 20 carbon atoms.

The hydroxy acid mentioned above may be ricinoleic acid, ricinolenic acid, a mixture of 9- and 10-hydroxystearic acids, 12-hydroxystearic acid, castor oil fatty acid, hydrogenated castor oil fatty acid, lactic acid and the like. The lactone may be ε-caprolactone, β-propiolactone, γ-butyrolactone, δ-valerolactone, β-methyl-δ-valerolactone, 4-methylcaprolactone, 2-methylcaprolactone and the like. Examples of the catalyst include quaternary ammonium salts such as tetramethylammonium chloride, tetrabutylammonium chloride, tetramethylammonium bromide, tetrabutylammonium bromide, tetramethylammonium iodide, tetrabutylammonium iodide, benzyltrimethylammonium chloride, benzyltrimethylammonium bromide and benzyltrimethylammonium iodide; quaternary phosphonium salts such as tetramethylphosphonium chloride, tetrabutylphosphonium chloride, tetramethylphosphonium bromide, tetrabutylphosphonium bromide, tetramethylphosphonium iodide, tetrabutylphosphonium iodide, benzyltrimethylphosphonium chloride, benzyltrimethylphosphonium bromide, benzyltrimethylphosphonium iodide, tetraphenylphosphonium chloride, tetraphenylphosphonium bromide and tetraphenylphosphonium iodide; phosphorus compounds such as triphenylphosphine; organic carboxylic acid salts such as potassium acetate, sodium acetate, potassium benzoate and sodium benzoate; alkali metal alcolates such as sodium alcolates and potassium alcolates; tertiary amines; organotin compounds; organoaluminum compounds; organotitanium compounds; and zinc compounds such as zinc chloride.

As the polymerization initiator, a monocarboxylic acid may be used. Examples of the monocarboxylic acid include aliphatic monocarboxylic acids such as acetic acid, propionic acid, caprylic acid, nonanoic acid, capric acid, octylic acid, lauric acid, myristic acid, palmitic acid, stearic acid, isononanoic acid and arachic acid; and aromatic monocarboxylic acids such as benzoic acid and p-butylbenzoic acid.

A polyester represented by formula (V) may be produced by reacting a diol represented by formula (XI) with a dibasic acid represented by formula (X). More specifically, it can be prepared by adding an initiation catalyst to an equimolar mixture of the diol and a dibasic acid mentioned above and heating. In this step, it is preferable to add the dibasic acid in a slightly excessive amount. The reaction temperature ranges from about 120° to 220° C., preferably 160° to 210° C. The reaction time ranges from about 0.5 to 72 hours. Reaction under nitrogen flow results in a higher polymerization degree. The reaction can be controlled easily by using an initiator. In formula (X) and (XI)

HO—CO—R⁴—COOH (X)

HO—R⁵—OH (XI)

R⁴ denotes a straight or branched alkylene group having 2 to 20 carbon atoms, C₆H₄ or CH=CH. R⁵ denotes a straight or branched alkylene group having 2 to 20 carbon atoms or a residue obtained by removing two hydroxyl groups from a polyalkylene glycol.

Examples of the diol include alkylene glycols such as ethylene glycol, propylene glycol, neopentyl glycol, 1,3-butanediol, 1,4-butanediol and 1,6-hexanediol; and diols having an ether linkage, such as diethylene glycol, dipropylene glycol and triethylene glycol. Examples of the dibasic acid include dibasic acids having an unsaturated bond, such as maleic anhydride and fumaric acid; aromatic dibasic acids such as phthalic anhydride and terephthalic acid; and saturated dibasic acids such as adipic acid and sebacic acid.

The polymerization catalyst and the initiator employed in the reaction may be similar to those employed in the preparation of a polyester represented by formula (IV).

A polyester in which the repeating units of formula (IV) and formula (V) were polymerized randomly can be produced by adding a polymerization catalyst to a hydroxy acid, a lactone, a mixture of such hydroxy acid and lactone or an equimolar mixture of a diol and a dibasic acid as mentioned above and heating. The reaction is conducted under conditions similar to that for formula (IV).

A polyester in which the repeating units of formula (IV) and formula (V) were block-polymerized can be produced by producing a polyester of formula (IV) and formula (V) followed by condensation dehydration.

The number average molecular weight of the polyester employed in the invention ranges from 300 to 20,000, although those having the molecular weight ranging from 1,000 to 10,000 are preferable in view of ability of dispersing pigments. This is because a molecular weight of 300 or lower causes difficulty in obtaining sufficient dispersing effect due to the short side chain of the dispersent, while a molecular weight of 20,000 or higher causes reduced flowability resulting from aggregation between pigments due to the long side chain of the dispersant. In order to obtain a polyester having such a desirable molecular weight, appropriate molar ratios between an initiator and the starting materials such as hydroxy acid, lactone, diol and dibasic acid and an appropriate reaction time, determined by monitoring the acid value of the intermediate reaction product are essential.

The polyamide employed in the preparation of a polyallylamine derivative according to the invention may be a compound represented by formula (VI) or formula (VII). In addition, a compound in which the repeating units in formula (VI) and formula (VII) are polymerized randomly may also be employed.

The polyamide represented by formula (VI) can be obtained using a lactam represented by formula (X) and an aminocarboxylic acid represented by formula (XIII) as starting materials. More specifically, it can be prepared by heating a lactam represented by formula (XII), an aminocarboxylic acid represented by formula (XIII) or a mixture of a lactam and an aminocarboxylic acid. The polymerization condensation is preferably conducted under nitrogen flow at a reaction temperature of about 150° to 210° C. A temperature of 250° C. or higher causes problems of coloring, while a temperature of 110° C. or lower results in a slow reaction. The reaction time ranges from about 0.5 to 72 hours. The reaction can be controlled easily by using an initiator. The reaction time can be reduced by adding a polymerization catalyst. The molecular weight can be determined by oxidation. When a lactam is employed as a starting material, a monocarboxylic acid may be used as an initiator in an amount of 0 to 0.5 moles per 1 mole of the lactam. In formula (XII) and (XIII)

(XII)

H₂N—R⁶—COOH (XIII)

R⁴ denotes a straight or branched alkylene group having 2 to 20 carbon atoms.

The lactam mentioned above may be ε-caprolactam, or ω-laurolactam, and the aminocarboxylic acid may be aminocaproic acid or 11-aminoundecanoic acid.

A polymerization catalyst and an initiator similar to those employed in the preparation of a polyester may be employed.

A polyamide represented by formula (VII) is prepared using as starting materials a dibasic acid represented by formula (X) and a diamine represented by formula (XIV) shown below. The dibasic acid employed herein may be similar to those employed in the preparation of a polyester mentioned above, and the diamine may be ethylenediamine, 1,4-diaminobutane, hexamethylenediamine and the like. In formula (XIV)

$$H_2N-R^7-NH_2 \quad (XIV)$$

$R^7$ denotes a straight or branched alkylene group having 2 to 20 carbon atoms.

The reaction conditions for the preparation of a polyamide represented by formula (VII) are similar to that for a polyamide represented by formula (VI).

To prepare a polyamide in which the repeating units in formula (VI) and formula (VII) were polymerized randomly, a lactam, aminocarboxylic acid, dibasic acid and diamine employed in the preparation of the compounds represented by formula (VI) and formula (VII) are employed under the polymerization condition for a polyamide described above.

A co-condensate of an ester and an amide (polyesteramide) employed in the preparation of a polyallylamine derivative according to the invention can be produced by subjecting one or more compounds selected from the group consisting of hydroxycarboxylic acids, lactones, dibasic acids and diols employed in the preparation of the polyester and the polyamide and one or more compounds selected from the group consisting of aminocarboxylic acids, lactams, dibasic acids and diamines described using the polymerization conditions for a polyamide described above. Alternatively, it may be prepared by condensing a polyester and a polyamide obtained by the method mentioned above previously, followed by further co-condensation. The polymerization conditions are similar to that described above, and the reaction can be terminated at the polymerization degree desired by monitoring the acid value of the reaction product.

The reaction of a polyallylamine with a polymer to be introduced into the side chain may be conducted in such a manner that per one mole of a polyallylamine having n amino groups, one or more moles, preferably 2 moles or more, but not exceeding 2n moles in view of the ability of dispersing pigments, in total, of one or more compounds selected from the group consisting of free carboxyl group-carrying polyesters, polyamides and co-condensates of esters and amides (polyesteramides) are added and reacted. In this step, different polyesters, polyamides and co-condensates of esters and amides (polyesteramides) may also be reacted simultaneously. In the reaction, a polymerization catalyst such as those described for the preparation of polyesters may be employed, and a solvent such as xylene and toluene may also be employed.

In this procedure, the reaction of a polyallylamine with a free carboxyl group-carrying polyester, polyamide or a co-condensate of an ester and an amide (polyesteramide) is a salt forming reaction or an acid amide bond forming reaction through the free amino group of the former and the terminal free carboxyl group of the latter. When a polyester or a polyesteramide is employed, the ester and the amino group of the side chain of the polyallylamine undergo simultaneous ester-amide exchange reactions depending on the types of polyesters and polyesteramides, as well as the reaction conditions employed. In this reaction, whether the salt is formed or the acid-amide bond is formed depends on the reaction conditions.

Although the acid-amide bond forming reaction and the salt forming reaction proceed simultaneously, the acid-amide bond forming reaction is performed at 90° to 210° C., preferably 100° to 210° C. A temperature of 250° C. or higher results in a colored reaction product, while a temperature of 90° C. or lower causes a prolonged reaction time. Less colored product can be obtained by a reaction under nitrogen flow. On the other hand, the preferred temperature for the salt forming reaction is generally lower and ranges from 20° to 140° C.

A preferred polyallylamine derivative according to the invention, in view of the ability of dispersing pigments, is obtained by subjecting 2 or more moles of the terminal carboxyl groups of polyesters, polyamides or co-condensates of esters and amides to the acid-amide bond forming reaction with a polyallylamine having n amino groups. The ratio of the residue in the form of the acid-amide bond represented by formula (III) based on n $R^1$ groups in formula (I) is preferably 60 to 95%, more preferably 65 to 90%.

When 60% or less of the amino groups present in the polyallylamine are covalently bounded via the amide bond, aggregation between pigments occurs, resulting in a product which cannot be used as a dispersant due to poor viscosity-reducing effect and poor paint film appearance. When 96 or more of the amino groups present in the polyallylamine are covalently bonded via the amide bond, the functional groups to be subjected to adsorption to the pigments become insufficient and contribute little to the dispersion of the pigment, resulting in a product which cannot be used as a dispersant due to a poor viscosity-reducing effect and poor paint film appearance.

In order to bind the amino group of a polyallylamine covalently in the ratio specified above in a polyallylamine derivative according to the invention, the difference between amine value A determined immediately after mixing the polyallylamine with at least one of a polyester, a polyamide and a co-condensate of an ester and an amide, which has a carboxyl group at its one terminal, and amine value B determined after completion of the reaction is calculated as shown below.

$$\text{Reactivity (\%)} \left\{ \begin{array}{l} \text{Rate of covalent bonding of amino} \\ \text{group in polyllamine derivative} \end{array} \right\} = \frac{A-B}{A} \times 100$$

Although the amine value immediately after mixing may be determined directly, the amine value of a polyallylamine to be employed as a starting material may be calculated from the amounts of the polymer and the polyallylamine added to be used in the reaction. Even when the amino group in a polyallylamine forms a salt with the carboxyl group of a polymer to be introduced to the side chain, the amine value to be obtained is not changed.

The performance of a polyallylamine derivative according to the present invention becomes higher when the weight ratio of polyallylamine and polyester, polyamide or co-condensate of an ester and an amide (polyesteramide) is 1/5 to 1/30, and the amine value (mg KOH/g) of the polyallylamine derivative obtained is 5 to 30. An amine value of 5 or lower causes insufficient adsorption to pigments which may lead to difficulty in dispersing the pigments, while an amine value of 30 or higher causes aggregation between the pigments which may also lead to difficulty in dispersing the pigments.

The acid value (mg KOH/g) of a polyallylamine derivative according to the invention is preferably 2.5 to 50 to obtain better dispersion of the pigments.

The weight average molecular weight of a polyallylamine derivative according to the invention which is obtained by the reaction described above is preferably 2,000 to 100,000 when used as a pigment dispersant.

A polyallylamine derivative according to the invention may also be prepared by subjecting a polyallylamine directly to the polymerization conditions for a polyester described above together with one or more of hydroxycarboxylic acids, lactones, dibasic acids as well as diols, aminocarboxylic acids, lactams, dibasic acids and diamines.

A polyallylamine derivative according to the invention can be used as a pigment dispersant since it has the ability to disperse a pigment thoroughly in a resin or an organic solvent. When using a polyallylamine derivative as a pigment dispersant, the organic solvent employed in the preparation of the polyallylamine derivative may be used, or another organic solvent may be newly added after distilling off the organic solvent employed in the preparation. Examples of such organic solvents are aromatic hydrocarbons such as toluene and xylene, aliphatic hydrocarbons such as n-hexane and n-heptane, ketones such as methylethyl ketone and acetone and esters such as ethyl acetate and butyl acetate, while aromatic and aliphatic hydrocarbons are preferred.

By treating a pigment using a pigment dispersant according to the invention, a treated pigment can be obtained.

Examples of the pigment which is dispersed with the pigment dispersant of the invention, namely, the pigment to which the pigment dispersant of the invention can be applied include inorganic pigments such as titanium dioxide, iron oxide, cadmium sulfide, calcium carbonate, barium carbonate, barium sulfate, clay, talc, chrome yellow and carbon black; and organic pigments such as azo, diazo, condensed azo, thioindigo, indanthrone, quinacridone, anthraquinone, benzoimidazolone, perilene, perinone, phthalocyanine, halogenated phthalocyanine, anthrapyridine and dioxazine pigments. The pigment dispersant exhibits excellent pigment dispersion effects to carbon black and the organic pigments.

Although the iron oxide described above may also be used as a magnetic material for magnetic tapes in addition to the use as a pigment, it should be understood that such iron oxide is within the scope of the pigments according to the present invention since a pigment dispersant according to the present invention allows microparticles to be dissolved satisfactorily in a resin or an organic solvent.

The method of treating of a pigment with a pigment dispersant according to the invention may be a dry method using a Henschel mixer, ball mill, atomizer colloid mill or Banbury mixer or a wet solvent method in which the solvent is removed after treatment in the solvent. Examples of the solvents employed in such wet solvent methods are aromatic hydrocarbons such as toluene and xylene, aliphatic hydrocarbons such as n-hexane and n-heptane, alcohols such as isopropanol and butanol, ethers such as ethylcellosolve and butylcellosolve, ketones such as methylethyl ketone and acetone, esters such as ethyl acetate and butyl acetate, and water.

The pigment dispersant of the present invention is used in an amount of from 1 to 200% by weight based on the pigment, calculated as the pigment-dispersible compound (polyallylamine derivative) in the pigment-containing resin composition.

Using a pigment dispersant according to the invention together with a pigment, a resin and optionally a solvent, a pigment-containing resin composition can be prepared. Examples of such pigment-containing resin compositions are resin products using pigments such as color paints, printing inks, copying toners, rubber magnets, magnetic tapes, molded plastics for household articles and building materials, architectural sealing agents and the like. A pigment-containing resin composition according to the invention is no different than a conventional pigment-containing composition with regard to the composition or in the process of preparation except for incorporation of a pigment dispersant according to the invention. The pigment-containing resin compositions contain resins, pigments, pigment dispersants, organic solvents and other appropriate additives.

As is well known, a color paint is produced by adding a pigment to a film-forming main component such as a resin or the like, a film-forming auxiliary component which is added to the main component in a small amount, both components are called film components (nonvolatile matters), and a film aid such as a solvent or a diluent, film components and a film aid are called clear paints (vehicles), and kneading the mixture. A printing ink is produced by adding a pigment to a vehicle formed by dissolving a resin in a solvent. A copying toner is produced by kneading a resin and a magnetic material. A rubber magnet used in a copier is produced by kneading a resin and a magnetic material. A magnetic tape is produced by coating a mixture of a magnetic material such as iron oxide, a solvent and a resin on a tape made of a resin as a substrate (iron oxide is also used as a pigment in color paint or the like, and it must be dispersed well in a resin as a magnetic material or as a pigment; in this invention, the term pigment is used in a broad sense, including such a pigment which is also used as a magnetic material). Color plastics moldings which are used in a wide range of applications from home appliances to building materials are produced by kneading a resin and a color pigment. A sealing material which is used for building construction is produced by kneading a resin and mainly an inorganic pigment.

To such a composition, a polyallylamine derivative according to the invention is added, to obtain an excellent pigment-containing resin composition according to the invention.

Examples of the resin to which the pigment dispersant of the invention is applied include a wide variety of resins, for examples, alkyd resins, polyester resins, acrylic resins, epoxy resins, polyurethane resins, silicone resins, fluorine resins, melamine resins, benzoguanamine resins, urea resins, polyamide resins, phenolic resins, vinyl chloride resins and polyethylene resins. However, the dispersion resin is not limited thereto.

The pigment-containing resin composition can be prepared directly by kneading the pigment dispersant of the invention with the pigment, the resin, the solvent and additives. It can also be formed by first forming a pigment dispersion paste and then mixing it with the resin, the solvent and the like.

The pigment dispersion paste may be composed of three components, namely, the pigment dispersant of the invention, the pigment and the organic solvent, four components, namely, these three components and a part or the whole of the film-forming resin, or these components and additives such as a defoamer, a surface adjustor and the like. This is the same as with a conveitonal pigment dispersion paste.

A pigment dispersion paste according to the invention can also be used as a paint by incorporating a resin for dispersion and other resins, although it can be used as a paint or a printing ink as it is.

Examples of the organic solvent of the pigment dispersion paste or the pigment-containing resin composition include hydrocarbon solvents such as toluene, xylene, high-boiling petroleum hydrocarbons, n-hexane, cyclohexane and n-heptane; halogenated hydrocarbon solvents such as methylene chloride, chloroform and dichloroethane; ether solvents such as dioxane, tetrahydrofuran, butyl ether, butyl ethyl ether and diglyme; ketone solvents such as methyl isobutyl ketone, cyclohexanone and isophorone; ester solvents such as ethyl acetate, butyl acetate, ethylene glycol monoethyl ether acetate and 2-methoxypropyl acetate; alcohol solvents such as methyl alcohol, ethyl alcohol, n-propyl alcohol, isopropyl alcohol, n-butyl alcohol, isobutyl alcohol, tert-butyl alcohol, amyl alcohol, n-hexyl alcohol, n-heptyl alcohol, 2-ethylhexyl alcohol, lauryl alcohol, stearyl alcohol, cyclopentanol, cyclohexanol, benzyl alcohol and p-tert-butylbenzyl alcohol; monoether solvents such as ethylene glycol monomethyl ether, ethylene glycol monoethyl ether, ethylene glycol monobutyl ether, propylene glycol monomethyl ether, propylene glycol monoethyl ether and propylene glycol monobutyl ether; and amide solvents such as dimethylacetamide and dimethylformamide. The organic solvent is appropriately selected from these solvents depending on the usage of the pigment dispersion paste or the pigment-containing resin composition. These can be used either singly or in combination.

The above-mentioned pigment dispersion paste or pigment-containing resin composition can be formed by dispersing the predetermined starting materials using a roll mill, a ball mill, a sand grind mill, a paint shaker, a kneader, a dissolver, an ultrasonic dispersing machine or the like depending on the usage of the pigment dispersion paste or the pigment-containing resin composition.

In such case, the treated pigment mentioned above may be kneaded with a resin, or, alternatively, an integral blend method may be employed in which a pigment dispersant, a pigment and a resin are kneaded simultaneously.

It is also possible to circulate the pigment-containing resin composition of the present invention as it is in a usable concentration upon appropriately adjusting the amount of the organic solvent at the time of the production; or this composition can be circulated in concentrated form and be used by a user upon diluting it with a solvent in an appropriate concentration.

EXAMPLES

The present invention is illustrated specifically by referring to the following Examples, Use Examples and Comparative Use Examples. In these Examples, "parts" and "%" are by weight.

Example 1

Preparation of a Polyester (1)

A reaction flask fitted with a thermometer, a stirrer, a nitrogen introduction inlet, a reflux condenser and a water separator was charged with 30.0 parts of xylene (made by Junsei Kagaku K.K.), 300.0 parts of 12-hydroxystearic acid (made by Junsei Kagaku K.K.) and 0.1 parts of tetrabutyl titanate (made by Tokyo Kasei K.K.), and the temperature was elevated to 160° C. in a nitrogen stream over a period of 4 hours. Further, the reaction mixture was heated at 160° C. for 4 hours (at this time, the acid value was approximately 20 mg KOH/g), and xylene was distilled off at 160° C. Then, the residue was cooled to room temperature, and water which was formed during the heating reaction was separated from xylene in the distillate, and this xylene was returned to the reaction solution.

This reaction solution was designated Polyester PE-1. The polyester contained in Polyester PE-1 had a number average molecular weight of 2,550 and an acid value of 22.0 mg KOH/g. The thus-formed polyester accompanied by the solvent (xylene) can be used as a starting material of a polyallylamine derivative.

Example 2

Preparation of a Polyester (2)

The same reaction flask as that used in Example 1 was charged with 30.0 parts of xylene, 300.0 parts of 12-hydroxystearic acid and 0.1 parts of tetrabutyl titanate, and the temperature was elevated to 160° C. in a nitrogen stream over a period of 4 hours. Further, the reaction mixture was heated at 160° C. for 4 hours (at this time, the acid value was approximately 5.0 mg KOH/g), and xylene was distilled off at 160° C. Water which was formed during the heating reaction was separated from xylene in the distillate, and this xylene was returned to the reaction solution. The reaction solution was then cooled to room temperature.

The reaction solution was designated PE-2. The polyester contained in Polyester PE-2 had a number average molecular weight of 9,655 and an acid value of 5.8 mg KOH/g.

Example 3

Preparation of a Polyester (3)

The same reaction flask as that used in Example 1 was charged with 30.0 parts of xylene, 300.0 parts of 12-hydroxystearic acid and 0.1 parts of tetrabutyl titanate, and the temperature was elevated to 160° C. in a nitrogen stream over a period of 4 hours. Further, the reaction mixture was heated at 160° C. for 0.5 hour (at this time, the acid value was approximately 100 mg KOH/g), and xylene was distilled off at 160° C. Water which was formed during the heating reaction was separated from xylene in the distillate, and this xylene was returned to the reaction solution. The reaction solution was then cooled to room temperature.

This reaction solution is designated Polyester PE-3. The polyester contained in Polyester PE-3 had a number average molecular weight of 550 and an acid value of 101.8 mg KOH/g.

Example 4

Preparation of a Polyester (4)

A reaction flask fitted with a thermometer, a stirrer, a nitrogen introduction inlet and a reflux condenser was charged with 10.0 parts of 12-hydroxystearic acid and 190.0 parts of ε-caprolactone (made by Junsei Kagaku K.K.), and the temperature was elevated to 160° C. in a nitrogen stream over a period of 4 hours. The reaction mixture was heated at 160° C. for 2 hours, and the heating was conducted until the residual amount of ε-caprolactone reached 1% or less. The reaction solution was then cooled to room temperature.

This reaction solution is designated Polyester PE-4. The polyester contained in Polyester FE-4 had a number average molecular weight of 2,604 and an acid value of 21.5 mg KOH/g.

Example 5

Preparation of a Polyester (5)

The same reaction flask as that used in Example 1 was charged with 5.0 parts of xylene, 15.5 parts of ethylene glycol (made by Junsei Kagaku K.K.), 36.5 parts of adipic acid (made by Junsei Kagaku K.K.) and 0.1 parts of tetrabutyl titanate (made by Tokyo Kasei), and the temperature was elevated to 160° C. in a nitrogen stream over a period of 4 hours. The mixture was further heated at 160° C. for 2 hours (at this time, the acid value was approximately 20 mg KOH/g), and xylene was distilled off at 160° C. Water which was formed during the heating reaction was separated from xylene in the distillate, and this xylene was returned to the reaction solution was then cooled to room temperature.

This reaction solution is designated Polyester PE-5. The polyester contained in Polyester PE-5 had a number average molecular weight of 2,604 and an acid value of 21.5 mg KOH/g.

Example 6

Preparation of a Polyester (6)

The same reaction flask as that used in Example 1 was charged with 12.5 parts of xylene, 15.5 parts of ethylene glycol, 36.5 parts of adipic acid, 75.0 parts of 12-hydroxystearic acid and 0.1 parts of tetrabutyl titanate, and the temperature was elevated to 160° C. in a nitrogen stream over a period of 4 hours. The mixture was further heated at 160° C. for 2 hours (at this time, the acid value was approximately 20 mg KOH/g), and xylene was distilled off at 160° C. Water which was formed during the heating reaction was separated from xylene in the distillate, and this xylene was returned to the reaction solution. The reaction solution was then cooled to room temperature.

This reaction solution is designated Polyester PE-6. The polyester contained in Polyester PE-6 had a number average molecular weight of 2,490 and an acid value of 22.5 mg KOH/g.

Example 7

Preparation of a Polyamide (1)

The same reaction flask as that used in Example 1 was charged with 8.0 parts of xylene, 34.9 parts of hexamethylenediamine and 43.8 parts of adipic acid, and the temperature was elevated to 160° C. in a nitrogen stream over a period of 4 hours. The mixture was further heated at 160° C. for 2 hours (at this time, the acid value was approximately 20 mg KOH/g), and xylene was distilled off at 160° C. Water which was formed during the heating reaction was separated from xylene in the distillate, and this xylene was returned to the reaction solution. The reaction solution was then cooled to room temperature.

This reaction solution is designated Polyamide PA-1. Polyamide PA-1 had a number average molecular weight of 2,830 and an acid value of 19.8 mg KOH/g.

Example 8

Preparation of a Copolycondensate of an Ester and an Amide (1)

The same reaction flask as that used in Example 1 was charged with 12.5 parts of xylene (made by Junsei Kagaku K.K.), 14.5 parts of hexamethylenediamine, 7.8 parts of ethylene glycol (made by Junsei Kagaku K.K.), 36.5 parts of adipic acid (made by Junsei Kagaku K.K.) and 0.1 parts of tetrabutyl titanate (made by Tokyo Kasei K.K.), and the temperature was elevated to 160° C. in a nitrogen stream over a period of 4 hours. The mixture was further heated at 160° C. for 2 hours (at this time, the acid value was approximately 20 mg KoH/g), and xylene was distilled off at 160° C. The reaction solution was then cooled to room temperature.

This reaction solution is designated Ester-Amide copolycondensate PEA-1. The copolycondensate of the ester and the amide contained in Ester-Amide Copolycondensate PEA-1 had a number average molecular weight of 2,460 and an acid value of 22.8 mg KOH/g.

Example 9

Preparation of a Polyallylamine Derivative (1)

A mixture of 25.0 parts of xylene and 70 parts of a polyallylamine 10% aqueous solution (PAA-1LV, made by Nitto Boseki Co., Ltd., number average molecular weight approximately 3,000) were charged into the same reaction flask as that used in Example 4 while being stirred at 160° C. Water was distilled off from the mixture using a separator. While xylene was returned to the reaction solution, 13.9 parts of Polyester PE-1 obtained in Example 1, which had been heated at 160°, were added thereto, and the reaction was conducted at 160° C. for 2 hours.

The resulting reaction mixture is designated Polyallylamine Derivatives PA-1. Polyallylamine Derivative PA-1 had a solids content of 40.1% and contained the polyallylamine derivative having a number average molecular weight of 10,500 and an amine value of 38.5 mg KOH/g (reactivity 88%).

Examples 10 to 25

Preparation of Polyallylamine Derivatives (2) to (11)

Polyallylamine derivatives PA-2 to PA-17 were prepared in the same manner as in Example 9 according to the formulation shown in Tables 1 and 2.

In the Table, PAA-1C indicates a compound which is made by Nitto Boseki Co., Ltd.having a number average molecular weight of 10,000.

Example 26

Preparation of Resin as Dispersion Medium Evaluated and Evaluation 348.0 parts of xylene were charged into a reaction vessel fitted with a thermometer, stirrer, nitrogen inlet, condenser and dripping funnel, and the temperature was raised to 35° C. After continuous dropwise addition of a mixture of 190.0 parts of methyl methacrylate, 158.0 parts of butyl methacrylate, 75.0 parts of 2-ethylhexyl methacrylate, 60.0 parts of styrene, 7.0 parts of acrylic acid, 110.0 parts of 2-hydroxyethyl methacrylate, 11.0 parts of azobisisobutyronitrile and 30.0 parts of dimethyl acetamide over a period of 2 hours, polymerization was effected at 85° C. for 1 hour. Then, a solution of 1.0 part of azobisisobutyronitrile in 10.0 parts of dimethyl acetamide was added and polymerization was further effected at 85° C. for 5 hours to complete the reaction (the reaction solution thus obtained is hereinafter referred to as resin ACJ).

Use Example 1 to 23

According to the formulation of the pigment dispersion pastes shown in Tables 3 to 4, polyallylamine derivatives PA-1 to 17 obtained in Examples 9 to 25 were admixed with other starting materials and then the pigments were dispersed uniformly using a paint shaker (manufactured by REDDEVIL) to yield pigment dispersion pastes. The pigment dispersion pastes thus obtained were examined for viscosity using a BROOKFIELD viscometer "model B" (manufactured by TOKYO SEIKI KK), and then they were stored at 50° C. for 5 days. Using the viscosity values determined initially and after 5 days using a model B viscometer, stability was determined on the basis that a value larger than 3 indicates poor results, a value of 2 to 3 indicates good results, and a value less than 2 indicates the best results.

In the Table, PVC indicates a copolymer of vinyl chloride and vinyl acetate (VAGH) made by Union Carbide, FW-200 indicates a carbon black pigment (FW-200) made by Degusa, Regal 400R indicates a carbon black pigment (REGAL 400R) made by Cabbot, YRT-795D indicates a quinacridone pigment (Cinkasha Red YRT-795D) made by Ciba Geigy, 13910HD indicates a quinazolopynazolone pigment (Viogen Red 13910HD) made by BASF, TR92 indicates a titanium dioxide pigment (Tioxide TR92) made by du Pont.

The starting materials of the paints shown in Tables 3 and 4 were mixed with the dispersion pastes to produce paints. Subsequently, each of the paints was diluted with a thinner (mixture of xylene and 2-methoxypropyl acetate at a weight ratio of 1:1) such that the viscosity became 25 seconds (25° C. ) as measured with a Ford Cup 4. The thus-obtained paint was spray-coated on a zinc phosphate-treated sheet having a thickness of 0.6 mm, and the thus-coated sheet was baked at 140° C. for 30 minutes to obtain a coated test sheet having a dry film thickness of approximately 40 μm.

The test paint films formed were examined for 20 degree mirror gloss (paint film 20 degree gloss) in accordance with JIS K5400 7.6, and subjected to a moisture resistance test, and then judged as one of three degrees consisting of best, good and poor. The film adhesion was evaluated by an adhesion test in accordance with JIS K5400 8.5.2, and judged on the basis that a score of 6 or lower indicates poor results, a score of 6 to 8 indicates good results, and a score of 8 or higher indicates good results.

In the Table, "melamine resin" indicates a melamine resin (Urban 220:solids content=60%) manufactured by Mitsui Toatsu Chemicals, Inc., and "leveling agent" indicates a leveling agent (Modaflow:10% xylene solution) made by Monsanto.

Comparative Use Examples 1 to 2

Dispersion pastes and paints were prepared in the same manner as in the above-mentioned Use Examples according to the formulation shown in Table 4. Coated test sheets were also formed as in the above-mentioned Use Examples, and the properties thereof were measured. The test results are shown in Table 4.

As is clear from Tables 3 and 4, Use Examples 1 to 17 using the polyallylamine derivatives PA-1 to PA-17 of the present invention were excellent in terms of the stability of the dispersion paste and the gloss of the coated film in comparison to Comparative Use Examples 1 and 2 not using the polyallylamine derivative, and had no adverse effect on the humidity resistance and the adhesion. Accordingly, it is understood that the pigment dispersant of the present invention is useful in the field of coloring materials.

Example 101

Preparation of Polyester (7)

A reaction flask fitted with a thermometer, a stirrer, a nitrogen introduction inlet and a reflux condenser was charged with 10.0 parts of 12-hydroxystearic acid, 60.0 parts of ε-caprolactone (made by Junsei Kaguku K.K.) and 0.01 parts of tetrabutyl titanate (made by Tokyo Kasei), and the temperature was elevated to 160° C. in a nitrogen stream over a period of 4 hours. The reaction mixture was heated at 160° C. for 2 hours, and the heating was conducted until the residual amount of ε-caprolactone reached 1% or less. The reaction solution was then cooled to room temperature.

This reaction solution is designated Polyester PE-101. The polyester contained in Polyester PE-101 had a number average molecular weight of 2,050 and an acid value of 26.30 mg KOH/g.

Example 102

Preparation of Polyester (8)

A reaction flask fitted with a thermometer, a stirrer, a nitrogen introduction inlet and a reflux condenser was charged with 10.0 parts of 12-hydroxystearic acid, 80.0 parts of ε-caprolactone and 0.01 parts of tetrabutyl titanate, and the temperature was elevated to 160° C. in a nitrogen stream over a period of 4 hours. The reaction mixture was heated at 160° C. for 2 hours, and the heating was conducted until the residual amount of ε-caprolactose reached 1% or less. The reaction solution was then cooled to room temperature.

This reaction solution is designated Polyester PE-102. The polyester contained in Polyester PE-102 had a number average molecular weight of 2,920 and an acid value of 18.5 mg KOH/g.

Example 103

Preparation of Polyester (9)

A reaction flask fitted with a thermometer, a stirrer, a nitrogen introduction inlet and a reflux condenser was charged with 10.0 parts of glicoric acid, 1306.0 parts of ε-caprolactone and 0.07 parts of tetrabutyl titanate, and the temperature was elevated to 170° C. in a nitrogen stream over a period of 4 hours until the residual amount of ε-caprolactone reached 1% or less. The reaction solution was then cooled to room temperature.

This reaction solution is designated Polyester PE-103. The polyester contained in Polyester PE-103 had a number average molecular weight of 8,570 and an acid value of 6.3 mg KOH/g.

Example 104

Preparation of Polyester (10)

A reaction flask fitted with a thermometer, a stirrer, a nitrogen introduction inlet and a reflux condenser was charged with 10.0 parts of glicoric acid, 506.0 parts of ε-caprolactone and 0.03 parts of tetrabutyl titanate, and the temperature was elevated to 170° C. in a nitrogen stream over a period of 3.5 hours until the residual amount of ε-caprolactone reached 1% or less. The reaction solution was then cooled to room temperature.

This reaction solution is designated Polyester PE-104. The polyester contained in Polyester PE-104 had a number average molecular weight of 5,630 and an acid value of 9.63 mg KOH/g.

Example 105

Preparation of Polyester (11)

A reaction flask fitted with a thermometer, a stirrer, a nitrogen introduction inlet and a reflux condenser was charged with 14.5 parts of caproic acid, 522.3 parts of 12-hydroxystearic acid, 463.2 parts of ε-caprolactone and 0.05 parts of tetrabutyl titanate, and-the temperature was elevated to 179° C. in a nitrogen stream over a period of 4 hours until the residual amount of ε-caprolactone reached 1% or less. The reaction solution was then cooled to room temperature.

This reaction solution is designated Polyester PE-105. The polyester contained in Polyester PE-105 had a number average molecular weight of 7,600 and an acid value of 7.1 mg KOH/g.

Example 106

Preparation of Polyester (12)

A reaction flask fitted with a thermometer, a stirrer, a nitrogen introduction inlet and a reflux condenser was charged with 10.0 parts of 12-hydroxystearic acid, 90.0 parts of ε-caprolactone, 20.0 parts of xylene and 0.01 parts of tetrabutyl titanate, and the temperature was elevated to 160° C. in a nitrogen stream over a period of 4 hours and the reaction mixture was heated at 180° C. for 2 hours. The heating was conducted until the residual amount of ε-caprolactone reached 1% or less. The reaction solution was then cooled to room temperature.

This reaction solution is designated Polyester PE-106. The polyester contained in Polyester PE-106 had a number average molecular weight of 5,870 and an acid value of 9.2 mg KOH/g.

Thus produced polyester (PE-106) which has solvent (xylene) can be used as a low material for preparation of polyallylamine derivatives.

Example 107

Preparation of Polyester (13)

A reaction flask fitted with a thermometer, a stirrer, a nitrogen introduction inlet and a reflux condenser was charged with 10.0 parts of 12-hydroxystearic acid, 160.0 parts of ε-caprolactone and 0.01 parts of tetrabutyl titanate, and the temperature was elevated to 160° C. in a nitrogen stream over a period of 4 hours. The reaction mixture was heated at 160° C. for 2 hours, and the heating was conducted until the residual amount of ε-caprolactone reached 1% or less. The reaction solution was then cooled to room temperature.

This reaction solution is designated Polyester PE-107. The polyester contained in Polyester PE-107 had a number average molecular weight of 9,850 and an acid value of 5.5 mg KOH/g.

Example 108

Preparation of Polyester (14)

A reaction flask fitted with a thermometer, a stirrer, a nitrogen introduction inlet, and a reflux condenser was charged with 10.0 parts of 12-hydroxystearic acid, 670.0 parts of ε-caprolactone and 0.1 parts of tetrabutyl titanate, and the temperature was elevated to 160° C. in a nitrogen stream over a period of 4 hours. The reaction mixture was heated at 180° C. for 2 hours, and the heating was conducted until the residual amount of ε-caprolactone reached 1% or less. The reaction solution was then cooled to room temperature.

This reaction solution is designated Polyester PE-108. The polyester contained in Polyester PE-108 had a number average molecular weight of 21,600 and an acid value of 2.5 mg KOH/g.

Example 109

Preparation of Polyester (15)

A reaction flask fitted with a thermometer, a stirrer, a nitrogen introduction inlet and a reflux condenser was charged with 10.0 parts of 12-hydroxystearic acid, 76.0 parts of ε-caprolactone (made by Junsei Kagaku K.K.) and 0.05 parts of tetrabutyl titanate (made by Tokyo Kasei), and the temperature was elevated to 160° C. in a nitrogen stream over a period of 4 hours. The reaction mixture was heated at 160° C. for 1 hour, and the heating was conducted until the residual amount of ε-caprolactone reached 1% or less. The reaction solution was then cooled to room temperature.

This reaction solution is designated Polyester PE-109. The polyester contained in Polyester PE-109 had a number average molecular weight of 614 and an acid value of 88.0 mg KOH/g.

Example 110

Preparation of Polyallylamine Derivative (18)

A mixture of 114.6 parts of xylene and 70 parts of a polyallylamine 10 wt % aqueous solution (PAA-1LV, made by Nitto Boseki Co., Ltd., number average molecular weight=approximately 3,000) were charged into the same reaction flask as that used in Example 9 while being stirred at 160° C. Water was distilled off from the mixture using a separator. While xylene was returned to the reaction solution. After 50% of water was distilled off, 69.59 parts of Polyester PE-4 obtained in Example 4, which had been heated at 160°, were added thereto, and the reaction was conducted at 160° C. for 2 hours.

The resulting reaction mixture is designated Polyallylamine Derivative PA-101. Polyallylamine Derivative PA-101 had a solids content of 40.1 wt % and contained the polyallylamine derivative having an amine value of 10.0 mg KOH/g and an acid value of 20.3 mg KOH/g.

Example 111

Preparation of Polyallylamine Derivative (19)

A mixture of 194.3 parts of xylene and 70 parts of a polyallylamine 10 wt. % aqueous solution (PAA-1LV, made by Nitto Boseki Co., Ltd., number average molecular weight=approximately 3,000) were charged into the same reaction flask as that used in Example 110 while being stirred at 120° C. Water was distilled off from the mixture using a separator. While toluene was returned to the reaction solution. After 50% of water was distilled off, 122.5 parts of Polyester PE-101 obtained in Example 22, which had been heated at 120° C., were added thereto, and the reaction was conducted at 120° C. for 5 hours.

The resulting reaction mixture is designated Polyallylamine Derivative PA-102. Polyallylamine Derivative PA-102 had a solids content of 40.2 wt. % and contained the polyallylamine derivative having an amine value of 10.0 mg KOH/g and an acid value of 23.3 mg KOH/g.

Examples 112 to 138

Preparation of Polyallylamine Derivatives (20) to (46)

Polyallylamine derivatives (20) to (46) were prepared in the same manner as in Example 31 according to the formulation shown in Tables 5 to 7.

Use Examples 101 to 151

According to the formulation of the pigment dispersion pastes shown in Tables 8 to 11, polyallylamine derivatives PA-101 to 129 obtained in Examples 110 to 138 were admixed with other starting materials and then the pigments were dispersed uniformly using a paint shaker (manufactured by REDDEVIL) to yield pigment dispersion pastes. The pigment dispersion pastes thus obtained were examined in the same manner as Use Examples 1 to 23.

In the Table, the terms PVC, FW-200, YRT-795D, 13910HD and TR92 are as same as in Use Examples 1 to 23.

Paints were prepared in the same manner according to the formulation shown in Tables 8 to 11 by mixing the starting materials using the above pigment dispersion pastes shown in Tables 8 to 11. A dry film thickness of approximately 40 μm was prepared in the same manner as Use Examples 1 to 23. The dry films were evaluated in the same manner as Use Examples 1 to 23. In the Table, the terms melamine resin and leveling agent are the same as in Use Examples 1 to 23.

Comparative Use Examples 101 to 104

Dispersion pastes and paints were prepared and evaluated in the same manner as in the above-mentioned Use Examples according to the formulation shown in Table 11.

Effects of the Invention

The polyallylamine derivative (pigment dispersant) which is a pigment-dispersible compound of the invention has excellent compatibility with a wide variety of resins and excellent pigment dispersibility. Therefore, color paint, printing ink and the like which are produced by using the this derivative exhibit excellent storage stability because pigment particles are not agglomerated, providing a coated film having excellent vividness and excellent smoothness. Further, the polyallylamine derivative of the invention prevents a color non-uniformity in coloration of plastics and improves a magnetic density in magnetic tapes.

Obviously, numerous modifications and variations of the present invention are possible in light of the above teachings. It is therefore to be understood that, within the scope of the appended claims, the invention may be practiced otherwise than as specifically described herein.

Japanese priority application Nos. 267486/1995 filed Oct. 16, 1995 and 237036/1996 filed Sep. 6, 1996 and incorporated herein by reference in their entirety.

TABLE 1

| | Examples | | | | | | | | |
|---|---|---|---|---|---|---|---|---|---|
| | 9 | 10 | 11 | 12 | 13 | 14 | 15 | 16 | 17 |
| Polyallylamine | PPA-1LV | PPA-1LV | PPA-1LV | PPA-1LV | PPA-1LV | PPA-1LV | PPA-1LV | PPA-1LV | PPA-1LV |
| Polyallylamine 10% sq. sol. | 70 | 70 | 70 | 70 | 70 | 70 | 70 | 70 | 70 |
| Polymer | PE-1 | PE-1 | PE-1 | PE-1 | PE-1 | PE-1 | PE-2 | PE-3 | PE-4 |
| Mn | 2550 | 2550 | 2550 | 2550 | 2550 | 9655 | 550 | 2604 | |
| Amount of Polymer | 13.92 | 69.59 | 313.16 | 69.59 | 69.59 | 69.59 | 52.70 | 3.00 | 14.21 |
| Xylene | 31.4 | 111.5 | 480.3 | 114.6 | 115.5 | 114.9 | 89.6 | 15.0 | 31.8 |
| Polyallylamine derivative | PA-1 | PA-2 | PA-3 | PA-4 | PA-5 | PA-6 | PA-7 | PA-8 | PA-9 |
| Solids content (wt. %) | 40.1 | 40.2 | 39.8 | 40.1 | 40.0 | 39.9 | 40.1 | 40.0 | 40.2 |
| Amine value just after mixing | 317.00 | 86.58 | 20.71 | 86.58 | 86.58 | 86.58 | 111.08 | 662.98 | 312.60 |
| Amine value of polyallylamine derivative | 38.5 | 32.0 | 8.0 | 10.0 | 20.0 | 35.0 | 38.0 | 34.0 | 31.0 |
| Reactivity | 88 | 63 | 61 | 88 | 77 | 60 | 66 | 95 | 90 |

TABLE 2

| | Examples | | | | | | | |
|---|---|---|---|---|---|---|---|---|
| | 18 | 19 | 20 | 21 | 22 | 23 | 24 | 25 |
| Polyallylamine | PPA-1LV | PPA-1LV | PPA-1LV | PPA-1LV | PPA-1LV | PPA-1LV | PPA-1LV | PPA-1LV |
| Polyallylamine 10% aq. sol. | 70 | 70 | 70 | 70 | 70 | 70 | 70 | 70 |
| Polymer | PE-5 | PE-6 | PA | PEA | PE-1 | PE-1 | PE-1 | PE-1 |
| Mn | 2348 | 2490 | 2830 | 2460 | 50000 | 200 | 2550 | 2550 |
| Amount of Polymer | 12.82 | 13.59 | 15.45 | 13.43 | 272.90 | 5.46 | 69.59 | 69.59 |
| Xylene | 29.7 | 30.9 | 33.7 | 30.7 | 419.6 | 18.7 | 114.6 | 115.2 |
| Polyallylamine derivative | PA-10 | PA-11 | PA-12 | PA-13 | PA-14 | PA-15 | PA-16 | PA-17 |
| Solids content (wt. %) | 39.9 | 39.9 | 40.0 | 40.2 | 40.1 | 40.0 | 40.3 | 40.0 |
| Amine value just after mixing | 334.64 | 322.04 | 295.42 | 324.63 | 23.69 | 532.27 | 86.58 | 86.58 |
| Amine value of polyallylamine derivative | 35.0 | 37.0 | 36.0 | 39.0 | 8.0 | 32.0 | 0.8 | 70.0 |
| Reactivity | 90 | 89 | 88 | 88 | 66 | 94 | 99 | 19 |

TABLE 3

| | | Use example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Formation of dispersion paste (%) | Polyallylamine derivative | PA-1 | PA-2 | PA-3 | PA-4 | PA-5 | PA-6 | PA-2 | PA-5 | PA-7 | PA-8 | PA-9 | PA-10 | PA-10 |
| | Amount of polyallylamine deriv. | 18.80 | 18.80 | 18.80 | 18.80 | 18.80 | 18.80 | 8.00 | 8.00 | 12.50 | 12.50 | 12.50 | 12.50 | 8.00 |
| | Dispersion resin | ACJ | ACJ | ACJ | ACJ | ACJ | ACJ | PVC | PVC | ACJ | ACJ | ACJ | ACJ | PVC |
| | Amount of dispersion resin | 29.20 | 29.20 | 29.20 | 29.20 | 29.20 | 29.20 | 14.00 | 14.00 | 33.30 | 33.30 | 33.30 | 33.30 | 14.00 |
| | Xylene | 19.00 | 19.00 | 19.00 | 19.00 | 19.00 | 19.00 | — | — | 14.60 | 14.60 | 14.60 | 14.60 | — |
| | 2-Methoxypropylacetate | 18.00 | 18.00 | 18.00 | 18.00 | 18.00 | 18.00 | — | — | 14.60 | 14.60 | 14.60 | 14.60 | — |
| | Toluene | — | — | — | — | — | — | 70.00 | 70.00 | — | — | — | — | 70.00 |
| | FW-200 | 15.00 | 15.00 | 15.00 | 15.00 | 15.00 | 15.00 | — | — | — | — | — | — | — |
| | R400R | — | — | — | — | — | — | 8.00 | 8.00 | — | — | — | — | 8.00 |
| | YRT-795D | — | — | — | — | — | — | — | — | 25.00 | 25.00 | — | — | — |
| | 13910HD | — | — | — | — | — | — | — | — | — | — | 25.00 | 25.00 | — |
| | TR-92 | — | — | — | — | — | — | — | — | — | — | — | — | — |
| Viscosity of dispersion paste (PS) | | 13.20 | 11.20 | 14.00 | 10.80 | 9.20 | 10.10 | 0.23 | 0.25 | 2.00 | 1.70 | 5.30 | 5.60 | 0.24 |
| Stability of dispersion paste | | best | best | best | best | best | best | best | best | best | best | best | best | best |
| Formulation of paint (%) | Dispersion paste | 17.80 | 17.80 | 17.80 | 17.80 | 17.80 | 17.80 | 100.00 | 100.00 | 32.30 | 32.30 | 32.30 | 32.30 | 100.00 |
| | Dispersion resin | 54.90 | 54.90 | 54.90 | 54.90 | 54.90 | 54.90 | — | — | 38.80 | 38.80 | 38.80 | 38.80 | — |
| | Melamine resin | 26.70 | 26.70 | 26.70 | 26.70 | 26.70 | 26.70 | — | — | 23.30 | 23.30 | 23.30 | 23.30 | — |
| | Leveling agent | 0.60 | 0.60 | 0.60 | 0.60 | 0.60 | 0.60 | — | — | 0.60 | 0.60 | 0.60 | 0.60 | — |
| 20 degree gloss of a coated film | | 83.00 | 85.00 | 82.00 | 85.00 | 83.00 | 83.00 | 89.00 | 91.00 | 86.00 | 87.00 | 83.00 | 84.00 | 88.00 |
| Humidity resistance of coated film | | best | best | best | best | best | best | best | best | best | best | best | best | best |
| Adhesion of coated film | | best | best | best | best | best | best | best | best | best | best | best | best | best |

TABLE 4

| | | Use examples | | | | | | | | | | Comparative | |
|---|---|---|---|---|---|---|---|---|---|---|---|---|---|
| | | 14 | 15 | 16 | 17 | 18 | 19 | 20 | 21 | 22 | 23 | 1 | 2 |
| Formation of dispersion paste (%) | Polyallylamine derivative | PA-11 | PA-12 | PA-12 | PA-13 | PA-14 | PA-14 | PA-15 | PA-15 | PA-16 | PA-17 | — | — |
| | Amount of polyallylamine deriv. | 3.30 | 12.50 | 8.00 | 12.50 | 12.50 | 8.00 | 12.50 | 8.00 | 12.50 | 12.50 | — | — |
| | Dispersion resin | ACJ | ACJ | PVC | ACJ | ACJ | PVC | ACJ | PVC | ACJ | ACJ | ACJ | PVC |
| | Amount of dispersion resin | 27.50 | 33.30 | 14.00 | 33.30 | 33.30 | 14.00 | 33.30 | 14.00 | 33.30 | 33.30 | 41.70 | 19.60 |
| | Xylene | 1.60 | 14.60 | — | 14.60 | 14.60 | — | 14.60 | — | 14.60 | 14.60 | 16.60 | — |
| | 2-Methoxypropyl-acetate | 1.60 | 14.60 | — | 14.60 | 14.60 | — | 14.60 | — | 14.60 | 14.60 | 16.70 | — |
| | Toluene | — | — | 70.00 | — | — | 70.00 | — | 70.00 | — | — | — | 72.40 |
| | FW-200 | — | — | — | — | — | — | — | — | — | — | — | — |
| | R400R | — | — | 8.00 | — | — | 8.00 | — | 8.00 | — | — | — | 8.00 |
| | YRT-795D | — | 25.00 | — | 25.00 | 25.00 | — | 25.00 | — | 25.00 | 25.00 | 25.00 | — |
| | 13910 HD | — | — | — | — | — | — | — | — | — | — | — | — |
| | TR-92 | 66.00 | — | — | — | — | — | — | — | — | — | — | — |
| Viscosity of dispersion paste (PS) | | 11.00 | 5.30 | 0.29 | 6.50 | 46.00 | 1.50 | 78.00 | 1.90 | 67.00 | 18.00 | 108.00 | 2.90 |
| Stability of dispersion paste | | best | best | best | best | best | best | best | best | good | good | bad | bad |
| Formulation of paint (%) | Dispersion paste | 54.50 | 32.30 | 100.00 | 32.30 | 32.30 | 100.00 | 32.30 | 100.00 | 32.30 | 32.30 | 32.30 | 32.30 |
| | Dispersion resin | 27.00 | 38.80 | — | 38.80 | 38.80 | — | 38.80 | — | 38.80 | 38.80 | 38.80 | 38.80 |
| | Melamine resin | 17.90 | 23.30 | — | 23.30 | 23.30 | — | 23.30 | — | 23.30 | 23.30 | 23.30 | 23.30 |
| | Leveling agent | 0.60 | 0.60 | — | 0.60 | 0.60 | — | 0.60 | — | 0.60 | 0.60 | 0.60 | 0.60 |
| 20 degree gloss of a coated film | | 90.00 | 83.00 | 87.00 | 84.00 | 53.00 | 78.00 | 39.00 | 75.00 | 34.00 | 49.00 | 46.00 | 75.00 |
| Humidity resistance of coated film | | best | best | best | best | best | best | best | best | good | best | good | good |
| Adhesion of coated film | | best | best | best | best | best | best | best | best | good | good | good | good |

TABLE 5

| | Examples | | | | | | | | | |
|---|---|---|---|---|---|---|---|---|---|---|
| | 110 | 111 | 112 | 113 | 114 | 115 | 116 | 117 | 118 | 119 |
| Polyallylamine | PAA-1LV | PAA-1LV | PAA-1LV | PAA-1LV | PAA-1LV | PAA-1LV | PAA-1LV | PAA-1LV | PAA-1C | PAA-1LV |
| Polyallylamine 10% aq. sol. | 70 | 70 | 70 | 70 | 70 | 70 | 70 | 70 | 70 | 70 |
| Polymer | PE-4 | PE-101 | PE-102 | PE-102 | PE-102 | PE-102 | PE-102 | PE-102 | PE-102 | PE-103 |
| Mn | 2604 | 2050 | 2920 | 2920 | 2920 | 2920 | 2920 | 2920 | 2920 | 8570 |

TABLE 5-continued

| | Examples | | | | | | | | | |
|---|---|---|---|---|---|---|---|---|---|---|
| | 110 | 111 | 112 | 113 | 114 | 115 | 116 | 117 | 118 | 119 |
| Amount of Polymer | 69.60 | 122.5 | 122.5 | 122.5 | 122.5 | 35.0 | 35.0 | 210.0 | 122.5 | 70.00 |
| Xylene | 113.95 | 194.3 | 194.3 | 194.3 | 194.3 | 63.0 | 63.0 | 325.5 | 194.3 | 115.50 |
| Polylallylamine derivative | PA-101 | PA-102 | PA-103 | PA-104 | PA-105 | PA-106 | PA-107 | PA-108 | PA-109 | PA-110 |
| Solid content | 40.20 | 40.2 | 40.2 | 40.4 | 40.1 | 40.2 | 40.4 | 40.1 | 40.0 | 40.2 |
| Amine value just after mixing | 86.57 | 51.21 | 51.21 | 51.21 | 51.21 | 157.88 | 157.88 | 30.56 | 51.21 | 86.12 |
| Amine value of polyallylamine derivative | 10.0 | 10.0 | 20.0 | 10.0 | 5.0 | 10.0 | 30.0 | 10.0 | 5.0 | 5.00 |
| Reactivity | 88 | 80 | 61 | 80 | 90 | 94 | 81 | 67 | 90 | 94.19 |
| Acid value of polyallylamine derivative | 10.00 | 23.20 | 15.00 | 16.20 | 16.50 | 14.20 | 14.20 | 16.80 | 16.40 | 4.90 |

TABLE 6

| | Examples | | | | | | | | | |
|---|---|---|---|---|---|---|---|---|---|---|
| | 120 | 121 | 122 | 123 | 124 | 125 | 126 | 127 | 128 | 129 |
| Polyallylamine | PAA-1LV | PAA-1C | PAA-1LV | PAA-1LV | PAA-1LV | PAA-1LV | PAA-1C | PAA-1LV | PAA-1LV | PAA-1C |
| Polyallylamine 10% aq. sol. | 70 | 70 | 70 | 70 | 70 | 70 | 70 | 70 | 70 | 70 |
| Polymer | PE-104 | PE-104 | PE-105* | PE-106 | PE-107 | PE-102 | PE-102 | PE-102 | PE-102 | PE-102 |
| Mn | 5630 | 5630 | 7600 | 7044 | 9850 | 2920 | 2920 | 2920 | 2920 | 2920 |
| Amount of Polymer | 122.50 | 122.50 | 70.00 | 122.50 | 70.00 | 280.00 | 280.00 | 105.00 | 105.00 | 35.00 |
| Xylene | 194.25 | 194.25 | 115.5 | 169.8 | 115.5 | 430.5 | 430.5 | 168.0 | 168.0 | 63.0 |
| Polyallylamine derivative | PA-111 | PA-112 | PA-113 | PA-114 | PA-115 | PA-116 | PA-117 | PA-118 | PA-119 | PA-120 |
| Solid content | 40.2 | 39.8 | 40.1 | 40.0 | 39.9 | 40.2 | 40.2 | 39.8 | 40.1 | 40.0 |
| Amine value just after mixing | 51.21 | 51.21 | 86.12 | 51.21 | 86.12 | 23.10 | 23.10 | 59.21 | 59.21 | 157.88 |
| Amine value of polyallylamine derivative | 5.00 | 20.00 | 10.0 | 10.0 | 15.0 | 10.0 | 15.0 | 1.0 | 50.0 | 72.0 |
| Reactivity | 90.24 | 60.94 | 88 | 80 | 83 | 57 | 35 | 98 | 16 | 54 |
| Acid value of polyallylamine derivative | 8.20 | 8.40 | 5.30 | 8.00 | 4.20 | 16.90 | 16.70 | 15.90 | 15.90 | 14.30 |

*includes xylene

TABLE 7

| | Examples | | | | | | | | |
|---|---|---|---|---|---|---|---|---|---|
| | 130 | 131 | 132 | 133 | 134 | 135 | 136 | 137 | 138 |
| Polyallylamine | PAA-1C | PAA-1C | PAA-1LV | PAA-1C | PAA-1LV | PAA-1C | PAA-1LV | PAA-1LV | PAA-1LV |
| Polyallylamine 10% aq. sol. | 70.00 | 70.00 | 70.00 | 70.00 | 70.00 | 70.00 | 70.00 | 70.00 | 70.00 |
| Polymer | PE-103 | PE-103 | PE-103 | PE-104 | PE-104 | PE-105 | PE-105 | PE-108 | PE-109 |
| Mn | 8570.00 | 8570.00 | 8570.00 | 5630.00 | 5630.00 | 7600.00 | 7600.00 | 21600.00 | 614.00 |
| Amount of Polymer | 43.75 | 63.70 | 70.00 | 66.50 | 66.50 | 43.75 | 63.70 | 70.00 | 70.00 |
| Xylene | 76.13 | 106.05 | 115.50 | 110.25 | 110.25 | 76.13 | 106.05 | 115.50 | 115.50 |
| Polyallylamine derivative | PA-121 | PA-122 | PA-123 | PA-124 | PA-125 | PA-126 | PA-127 | PA-128 | PA-129 |
| Solid content | 40.60 | 40.20 | 40.50 | 40.50 | 40.20 | 40.00 | 40.20 | 40.30 | 40.30 |
| Amine value just after mixing | 130.66 | 93.79 | 86.12 | 90.22 | 90.22 | 130.66 | 93.79 | 86.12 | 86.12 |
| Amine value of polylallylamine derivative | 79.00 | 41.00 | 43.00 | 42.00 | 48.00 | 81.00 | 47.00 | 31.00 | 47.00 |
| Reactivity | 39.54 | 56.29 | 50.07 | 53.45 | 46.80 | 38.01 | 49.89 | 75.00 | 80.00 |
| Acid value of polyallylamine derivative | 4.20 | 4.80 | 4.70 | 7.50 | 7.80 | 5.70 | 5.60 | 2.50 | 76.30 |

TABLE 8

| | | Use example | | | | | | | | | | | | | |
|---|---|---|---|---|---|---|---|---|---|---|---|---|---|---|---|
| | | 101 | 102 | 103 | 104 | 105 | 106 | 107 | 108 | 109 | 110 | 111 | 112 | 113 | 114 |
| Formation of dispersion paste (%) | Polyallylamine derivative | PA-101 | PA-103 | PA-104 | PA-105 | PA-106 | PA-107 | PA-108 | PA-110 | PA-111 | PA-113 | PA-114 | PA-115 | PA-116 | PA-117 |
| | Amount of polyallylamine deriv. | 18.8 | 18.8 | 18.8 | 18.8 | 18.8 | 18.8 | 18.8 | 18.8 | 18.8 | 18.8 | 18.8 | 18.8 | 18.8 | 18.8 |
| | Dispersion resin | ACJ | ACJ | ACJ | ACJ | ACJ | ACJ | ACJ | ACJ | ACJ | ACJ | ACJ | ACJ | ACJ | ACJ |
| | Amount of dispersion resin | 18.0 | 18.0 | 18.0 | 18.0 | 18.0 | 18.0 | 18.0 | 18.0 | 18.0 | 18.0 | 18.0 | 18.0 | 29.2 | 29.2 |
| | Xylene | 19.0 | 19.0 | 19.0 | 19.0 | 19.0 | 19.0 | 19.0 | 19.0 | 19.0 | 19.0 | 19.0 | 19.0 | 19.0 | 19.0 |
| | 2-Methoxypropylacetate | 29.2 | 29.2 | 29.2 | 29.2 | 29.2 | 29.2 | 29.2 | 29.2 | 29.2 | 29.2 | 29.2 | 29.2 | 18.0 | 18.0 |
| | Toluene | — | — | — | — | — | — | — | — | — | — | — | — | — | — |
| | FW-200 | 15.0 | 15.0 | 15.0 | 15.0 | 15.0 | 15.0 | 15.0 | 15.0 | 15.0 | 15.0 | 15.0 | 15.0 | 15.0 | 15.0 |
| | R400R | — | — | — | — | — | — | — | — | — | — | — | — | — | — |
| | YRT-795D | — | — | — | — | — | — | — | — | — | — | — | — | — | — |
| | 13910HD | — | — | — | — | — | — | — | — | — | — | — | — | — | — |
| | TR-92 | — | — | — | — | — | — | — | — | — | — | — | — | — | — |
| Viscosity of dispersion paste (PS) | | 10.8 | 9.2 | 8.1 | 8.4 | 9.6 | 9.9 | 9.8 | 10.0 | 10.2 | 9.3 | 10.1 | 9.7 | 39.2 | 48.2 |
| Stability of dispersion paste | | best | best | best | best | best | best | best | best | best | best | best | best | best | best |
| Formulation of paint (%) | Dispersion paste | 17.8 | 17.8 | 17.8 | 17.8 | 17.8 | 17.8 | 17.8 | 17.8 | 17.8 | 17.8 | 17.8 | 17.8 | 17.8 | 17.8 |
| | Dispersion resin | 54.9 | 54.9 | 54.9 | 54.9 | 54.9 | 54.9 | 54.9 | 54.9 | 54.9 | 54.9 | 54.9 | 54.9 | 54.9 | 54.9 |
| | Melamine resin | 26.7 | 26.7 | 26.7 | 26.7 | 26.7 | 26.7 | 26.7 | 26.7 | 26.7 | 26.7 | 26.7 | 26.7 | 26.7 | 26.7 |
| | Leveling agent | 0.6 | 0.6 | 0.6 | 0.6 | 0.6 | 0.6 | 0.6 | 0.6 | 0.6 | 0.6 | 0.6 | 0.6 | 0.6 | 0.6 |
| 20 degree gloss of a coated film | | 85.0 | 93.0 | 96.0 | 95.0 | 91.0 | 88.0 | 89.0 | 93.0 | 94.0 | 92.0 | 86.0 | 91.0 | 65.0 | 34.0 |
| Humidity resistance of coated film | | best | best | best | best | best | best | best | best | best | best | best | best | best | good |
| Adhesion of coated film | | best | best | best | best | best | best | best | best | best | best | best | best | best | good |

TABLE 9

| | | Use example | | | | | | | | | | | | | |
|---|---|---|---|---|---|---|---|---|---|---|---|---|---|---|---|
| | | 115 | 116 | 117 | 118 | 119 | 120 | 121 | 122 | 123 | 124 | 125 | 126 | 127 | 128 |
| Formation of dispersion paste (%) | Polyallylamine derivative | PA-118 | PA-119 | PA-120 | PA-1212 | PA-122 | PA-124 | PA-126 | PA-102 | PA-105 | PA-107 | PA-109 | PA-111 | PA-112 | PA-113 |
| | Amount of polyallylamine deriv. | 18.8 | 18.8 | 18.8 | 18.8 | 18.8 | 18.8 | 18.8 | 8.00 | 8.00 | 8.00 | 8.00 | 8.00 | 8.00 | 8.00 |
| | Dispersion resin | ACJ | ACJ | ACJ | ACJ | ACJ | ACJ | ACJ | PVC | PVC | PVC | PVC | PVC | PVC | PVC |
| | Amount of dispersion resin | 29.2 | 29.2 | 29.2 | 29.2 | 29.2 | 29.2 | 29.2 | 14.00 | 14.00 | 14.00 | 14.00 | 14.00 | 14.00 | 14.00 |
| | Xylene | 19.0 | 19.0 | 19.0 | 19.0 | 19.0 | 19.0 | 19.0 | — | — | — | — | — | — | — |
| | 2-Methoxypropylacetate | 18.0 | 18.0 | 18.0 | 18.0 | 18.0 | 18.0 | 18.0 | — | — | — | — | — | — | — |
| | Toluene | — | — | — | — | — | — | — | 70.00 | 70.00 | 70.00 | 70.00 | 70.00 | 70.00 | 70.00 |
| | FW-200 | 15.0 | 15.0 | 15.0 | 15.0 | 15.0 | 15.0 | 15.0 | — | — | — | — | — | — | — |
| | R400R | — | — | — | — | — | — | — | 8.00 | 8.00 | 8.00 | 8.00 | 8.00 | 8.00 | 8.00 |
| | YRT-795D | — | — | — | — | — | — | — | — | — | — | — | — | — | — |
| | 13910HD | — | — | — | — | — | — | — | — | — | — | — | — | — | — |
| | TR-92 | — | — | — | — | — | — | — | — | — | — | — | — | — | — |
| Viscosity of dispersion paste (PS) | | 28.2 | 62.4 | 53.2 | 64.2 | 35.4 | 37.2 | 53.2 | 0.25 | 0.21 | 0.27 | 0.22 | 0.23 | 0.35 | 0.28 |
| Stability of dispersion paste | | good | good | good | good | good | good | good | best | best | best | best | best | best | best |
| Formulation of paint (%) | Dispersion paste | 17.8 | 17.8 | 17.8 | 17.8 | 17.8 | 17.8 | 17.8 | 100.00 | 100.00 | 100.00 | 100.00 | 100.00 | 100.00 | 100.00 |
| | Dispersion resin | 54.9 | 54.9 | 54.9 | 54.9 | 54.9 | 54.9 | 54.9 | — | — | — | — | — | — | — |
| | Melamine resin | 26.7 | 26.7 | 26.7 | 26.7 | 26.7 | 26.7 | 26.7 | — | — | — | — | — | — | — |
| | Leveling agent | 0.6 | 0.6 | 0.6 | 0.6 | 0.6 | 0.6 | 0.6 | — | — | — | — | — | — | — |
| 20 degree gloss of a coated film | | 38.0 | 47.0 | 52.0 | 35.0 | 58.0 | 64.0 | 39.0 | 90.0 | 93.0 | 90.0 | 92.0 | 93.0 | 88.0 | 89.0 |
| Humidity resistance of coated film | | good | good | best | good | best | best | good | best | best | best | best | best | best | best |
| Adhesion of coated film | | good | good | good | good | good | good | good | best | best | best | best | best | best | best |

TABLE 10

| | | Use example | | | | | | | | | | | | | |
|---|---|---|---|---|---|---|---|---|---|---|---|---|---|---|---|
| | | 129 | 130 | 131 | 132 | 133 | 134 | 135 | 136 | 137 | 138 | 139 | 140 | 141 | 142 |
| Formation of dispersion paste (%) | Polyallylamine derivative | PA-122 | PA-123 | PA-124 | PA-125 | PA-102 | PA-107 | PA-109 | PA-110 | PA-111 | PA-112 | PA-113 | PA-121 | PA-122 | PA-124 |
| | Amount of polyallylamine deriv. | 8.00 | 8.00 | 8.00 | 8.00 | 3.30 | 3.30 | 3.30 | 3.30 | 3.30 | 3.30 | 3.30 | 13.30 | 3.30 | 3.30 |
| | Amount of dispersion resin | 14.00 | 14.00 | 14.00 | 14.00 | 27.50 | 27.50 | 27.50 | 27.50 | 27.50 | 27.50 | 27.50 | 27.50 | 27.50 | 27.50 |
| | Xylene | — | — | — | — | 1.60 | 1.60 | 1.60 | 1.60 | 1.60 | 1.60 | 1.60 | 1.60 | 1.60 | 1.60 |
| | 2-Methoxypropylacetate | — | — | — | — | 1.60 | 1.60 | 1.60 | 1.60 | 1.60 | 1.60 | 1.60 | 1.60 | 1.60 | 1.60 |
| | Toluene | 70.00 | 70.00 | 70.00 | 70.00 | — | — | — | — | — | — | — | — | — | — |
| | FW-200 | — | — | — | — | — | — | — | — | — | — | — | — | — | — |
| | R400R | 8.00 | 8.00 | 8.00 | 8.00 | — | — | — | — | — | — | — | — | — | — |
| | YRT-795D | — | — | — | — | — | — | — | — | — | — | — | — | — | — |
| | 13910HD | — | — | — | — | — | — | — | — | — | — | — | — | — | — |
| | TR-92 | — | — | — | — | 66.00 | 66.00 | 66.00 | 66.00 | 66.00 | 66.00 | 66.00 | 66.00 | 66.00 | 66.00 |
| Viscosity of dispersion paste (PS) | | 1.20 | 0.85 | 1.03 | 0.80 | 1.50 | 1.80 | 2.00 | 2.80 | 3.20 | 3.50 | 2.50 | 9.70 | 5.30 | 7.20 |
| Stability of dispersion paste | | good | good | good | good | best | best | best | best | best | best | best | good | good | best |
| Formulation of paint (%) | Dispersion paste | 100.00 | 100.00 | 100.00 | 100.00 | 54.5 | 54.5 | 54.5 | 54.5 | 54.5 | 54.5 | 54.5 | 54.5 | 54.5 | 54.5 |
| | Dispersion resin | — | — | — | — | 27.0 | 27.0 | 27.0 | 27.0 | 27.0 | 27.0 | 27.0 | 27.0 | 27.0 | 27.0 |
| | Melamine resin | — | — | — | — | 17.9 | 17.9 | 17.9 | 17.9 | 17.9 | 17.9 | 17.9 | 17.9 | 17.9 | 17.9 |
| | Leveling agent | — | — | — | — | 0.6 | 0.6 | 0.6 | 0.6 | 0.6 | 0.6 | 0.6 | 0.6 | 0.6 | 0.6 |
| 20 degree gloss of a coated film | | 65.0 | 68.0 | 77.0 | 78.0 | 89.0 | 87.0 | 84.0 | 81.0 | 82.0 | 83.0 | 86.0 | 32.0 | 48.0 | 45.0 |
| Humidity resistance of coated film | | good | good | best | best | best | best | best | best | best | best | best | good | good | good |
| Adhesion of coated film | | best | best | best | good | best | best | best | best | best | best | best | good | good | good |

TABLE 11

| | | Use examples | | | | | | | | | Comparative | | | |
|---|---|---|---|---|---|---|---|---|---|---|---|---|---|---|
| | | 143 | 144 | 145 | 146 | 147 | 148 | 149 | 150 | 151 | 101 | 102 | 103 | 104 |
| Formation of dispersion paste (%) | Polyallylamine derivative | PA-126 | PA-102 | PA-104 | PA-107 | PA-110 | PA-126 | PA-127 | PA-128 | PA-129 | — | — | — | — |
| | Amount of polyallylamione deriv. | 3.30 | 12.50 | 12.50 | 12.50 | 12.50 | 12.50 | 12.50 | 12.50 | 12.50 | 18.8 | 8.00 | 3.30 | 12.50 |
| | Dispersion resin | ACJ | ACJ | ACJ | ACJ | ACJ | ACJ | ACJ | ACJ | ACJ | ACJ | PVC | ACJ | ACJ |
| | Amount of dispersion resin | 27.50 | 33.30 | 33.30 | 33.30 | 33.30 | 33.30 | 33.30 | 33.30 | 33.30 | 29.2 | 14.00 | 27.50 | 33.30 |
| | Xylene | 1.60 | 14.60 | 14.60 | 14.60 | 14.60 | 14.60 | 14.60 | 14.60 | 14.60 | 19.0 | — | 1.60 | 14.60 |
| | 2-Methoxypropylacetate | 1.60 | 14.60 | 14.60 | 14.60 | 14.60 | 14.60 | 14.60 | 14.60 | 14.60 | 18.0 | — | 1.60 | 14.60 |
| | Toluene | — | — | — | — | — | — | — | — | — | — | 70.00 | — | — |
| | FW-200 | — | — | — | — | — | — | — | — | — | 15.0 | — | — | — |
| | R400R | — | — | — | — | — | — | — | — | — | — | 8.00 | — | — |
| | YRT-795O | — | 25.00 | 25.00 | 25.00 | 25.00 | 25.00 | 25.00 | 25.00 | 25.00 | — | — | — | 25.00 |
| | 13910 HD | — | — | — | — | — | — | — | — | — | — | — | — | — |
| | TR-92 | 66.00 | — | — | — | — | — | — | — | — | — | — | 66.00 | — |
| Viscosity of dispersion paste (PS) | | 10.50 | 7.8 | 8.2 | 8.3 | 9.2 | 12.5 | 14.0 | 25.0 | 34.0 | 94.2 | 2.90 | 26.70 | 35.0 |
| Stability of dispersion paste | | good | best | best | best | best | good | good | best | best | bad | bad | bad | bad |
| Formulation of paint (%) | Dispersion paste | 54.5 | 32.3 | 32.3 | 32.3 | 32.3 | 32.3 | 32.3 | 32.3 | 32.3 | 17.8 | 100.00 | 54.5 | 32.3 |
| | Dispersion resin | 27.00 | 38.8 | 38.8 | 38.8 | 38.8 | 38.8 | 38.8 | 38.8 | 38.8 | 54.9 | — | 27.0 | 38.8 |
| | Melamine resin | 17.90 | 23.2 | 23.2 | 23.2 | 23.2 | 23.2 | 23.2 | 23.2 | 23.2 | 26.7 | — | 17.9 | 23.3 |
| | Leveling agent | 0.60 | 0.60 | 0.6 | 0.6 | 0.6 | 0.6 | 0.6 | 0.6 | 0.6 | 0.6 | — | 0.6 | 0.6 |
| 20 degree gloss of a coated film | | 38.0 | 96.0 | 94.00 | 91.0 | 93.0 | 75.0 | 79.0 | 62.0 | 51.0 | 53.0 | 75.0 | 52.0 | 63.0 |
| Humidity resistance of coated film | | good | best | best | best | best | good | good | best | best | bad | good | good | bad |
| Adhesion of coated film | | good | best | best | best | best | best | best | best | best | bad | good | good | bad |

What is claimed as new and desired to be secured by Letters Patent of the United States is:

1. A polyallylamine represented by formula (I):

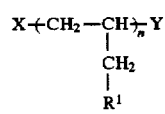  (I)

wherein each of X and Y, independently, are an initiator residue or chain transfer catalyst residue, $R^1$ is a free amino group or a group represented by formula (II) or (III), n is an integer of 2 to 1,000, provided that at least one of said $R^1$s is a group represented by formula (III).

—NH$_3$⁺(OCOR²)⁻   (II)

—NHCOR²   (III)

wherein $R^2$ is a residue obtained by removing a carboxyl group from a polyester having a free carboxylic acid, a polyamide having a free carboxylic acid or a polyesteramide having a free carboxylic acid.

2. The polyallylamine of claim 1, wherein $R^2$ is a residue obtained by removing a carboxyl group from a polyester having a free carboxylic acid.

3. The polyallylamine of claim 1, wherein $R^2$ is a residue obtained by removing a carboxyl group from a polyester having a free carboxylic acid represented by formula (IV), (V) or both,

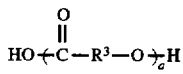 (IV)

wherein $R^3$ denotes a straight or branched alkylene group having 2 to 20 carbon atoms, and a denotes an integer of 2 to 100,

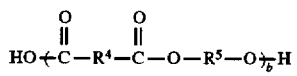 (V)

and wherein $R^4$ denotes a straight or branched alkylene group having 2 to 20 carbon atoms, $C_6H_4$ or CH=CH, $R^5$ denotes a straight or branched alkylene group having 2 to 20 carbon atoms or a residue obtained by removing two hydroxyl groups from a polyalkylene glycol, and b denotes an integer of 2 to 100, wherein the alkylene group optionally contains an ether bond.

4. The polyallylamine of claim 1, wherein 60–95% of said $R^1$'s have formula (III).

5. The polyallylamine of claim 1, obtained by reacting a polyallylamine with a free carboxylic acid-carrying polyester represented by formula (IV) or (V), a polyamide represented by formula (VI) or (VII) or both:

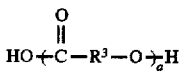 (IV)

wherein $R^3$ is a straight or branched alkylene group having 2 to 20 carbon atoms, and a is an integer of 2 to 100;

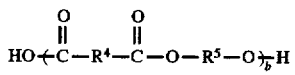 (V)

wherein $R^4$ is a straight or branched alkylene group having 2 to 20 carbon atoms, $C_6H_4$ or CH=CH, $R^5$ is a straight or branched alkylene group having 2 to 20 carbon atoms or a residue obtained by removing two hydroxyl groups from a polyalkylene glycol, and b is an integer of 2 to 100, said alkylene group optionally containing an ether bond;

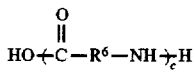 (VI)

wherein $R^6$ is a straight or branched alkylene group having 2 to 20 carbon atoms and c is an integer of 2 to 10;

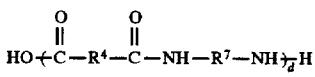 (VII)

wherein $R^4$ is a straight or branched alkylene group having 2 to 20 carbon atoms, $C_6H_4$ or CH=CH, $R^7$ is a straight or branched alkylene group having 2 to 20 carbon atoms, and d is an integer of 2 to 100.

6. The polyallyamine of claim 5, wherein 60 to 95% of amino groups in said polyallylamine are bonded through an acid amide bond to said polyester (IV) or (V) or said polyamide (VI) or (VII).

7. The polyallylamine of claim 1, wherein $R^2$ is a polyester having a free carboxylic acid, and wherein said polyester has a number average molecular weight of 500 to 20,000.

8. A pigment dispersant, comprising the polyallylamine of claim 1 and a solvent.

9. A treated pigment obtained by contacting a pigment with the pigment dispersant of claim 8.

10. A pigment-containing resin, comprising the polyallylamine of claim 1, a resin and a pigment.

11. A paint or ink composition comprising the polyallylamine of claim 1, a pigment, and a paint or ink base.

* * * * *